(12) United States Patent
Pon

(10) Patent No.: US 10,591,610 B2
(45) Date of Patent: Mar. 17, 2020

(54) METHOD AND APPARATUS FOR OPTIMIZING GNSS SEARCH WITH WIRELESS WIDE AREA NETWORKS

(71) Applicant: QUALCOMM Incorporated, San Diego, CA (US)

(72) Inventor: Rayman Pon, Cupertino, CA (US)

(73) Assignee: QUALCOMM Incorporated, San Diego, CA (US)

( * ) Notice: Subject to any disclaimer, the term of this patent is extended or adjusted under 35 U.S.C. 154(b) by 277 days.

(21) Appl. No.: 15/713,078

(22) Filed: Sep. 22, 2017

(65) Prior Publication Data

US 2019/0094377 A1 Mar. 28, 2019

(51) Int. Cl.
| | | |
|---|---|---|
| *G01S 19/25* | (2010.01) | |
| *G01S 19/23* | (2010.01) | |
| *G01S 19/24* | (2010.01) | |
| *G01S 19/14* | (2010.01) | |
| *G01S 19/30* | (2010.01) | |
| *G01S 19/54* | (2010.01) | |

(52) U.S. Cl.
CPC ............ *G01S 19/256* (2013.01); *G01S 19/14* (2013.01); *G01S 19/235* (2013.01); *G01S 19/24* (2013.01); *G01S 19/30* (2013.01); *G01S 19/23* (2013.01); *G01S 19/252* (2013.01); *G01S 19/54* (2013.01)

(58) Field of Classification Search
CPC ...... G01S 19/256; G01S 19/14; G01S 19/235; G01S 19/24; G01S 19/30
USPC .................................................... 342/357.64
See application file for complete search history.

(56) References Cited

U.S. PATENT DOCUMENTS

| | | | |
|---|---|---|---|
| 6,778,134 B2 | 8/2004 | Dooley et al. | |
| 7,463,979 B2* | 12/2008 | King ..................... | G01S 5/0063 342/357.64 |
| 7,558,356 B2 | 7/2009 | Pollman et al. | |
| 9,113,432 B2 | 8/2015 | Teed-Gillen et al. | |
| 9,341,716 B2 | 5/2016 | Syrjarinne et al. | |
| 2005/0212700 A1* | 9/2005 | Diggelen ............... | G01S 19/05 342/357.42 |
| 2011/0102256 A1* | 5/2011 | Shen ...................... | G01S 19/05 342/357.31 |
| 2012/0229334 A1* | 9/2012 | Waters ................... | G01S 19/05 342/357.42 |
| 2013/0136154 A1* | 5/2013 | Chomal ................ | H04B 1/7075 375/136 |
| 2014/0004887 A1* | 1/2014 | Farmer ................. | H04W 56/00 455/456.6 |
| 2016/0187458 A1 | 6/2016 | Shah et al. | |
| 2017/0279899 A1* | 9/2017 | Jain ....................... | H04L 67/142 |

* cited by examiner

*Primary Examiner* — Harry K Liu
(74) *Attorney, Agent, or Firm* — Kilpatrick Townsend & Stockton, LLP

(57) ABSTRACT

Disclosed are a system, apparatus, and method for optimizing GNSS search. A first radio signal is received from a terrestrial base station and a coarse location of the mobile device is estimated. A first time offset of the terrestrial base station to a timing signal of a target satellite is determined for locating a position of the target satellite. A distance from the position of the target satellite to the estimated coarse location of the mobile device is determined. A GNSS search is performed based on the distance from the target satellite and the first time offset of the first radio signal from the first terrestrial base station.

28 Claims, 4 Drawing Sheets

METHOD AND APPARATUS FOR OPTIMIZING GNSS SEARCH WITH WIRELESS WIDE AREA NETWORKS

FIELD

The subject matter disclosed herein relates generally to searching for satellite vehicles by a device, and more specifically for optimizing GNSS search with wireless wide area networks.

BACKGROUND

Determining location fixes via GNSS (e.g., GPS, GLONASS, Galileo, and BeiDou Navigation System) can be costly in terms of time and power resources, particularly with regards to mobile devices where GNSS receivers are often implemented. In some cases an accurate absolute time and GNSS location fix typically involves triangulation from at least three satellites. Additionally, GNSS location determination consumes power even for short duty cycles to initiate satellite acquisition. In some cases, GNSS related power consumption increases as GNSS signal levels decrease. For example, GNSS signal may decrease or disappear entirely when satellites are obscured by terrain or man made objects (i.e., inside or near buildings). For deep indoor situations, a GNSS fix may not be achievable due to low signal levels, so time accuracy cannot be maintained. In these instances, mobile devices will consume extraordinary amounts of power to try to attempt GNSS acquisition. Therefore, improved techniques to improve GNSS search are beneficial.

BRIEF SUMMARY

In one embodiment, a mobile device leverages signals from terrestrial base stations and crowdsourced data to improve GNSS search capabilities. In some embodiments, the mobile device can utilize signals from multiple terrestrial base stations to verify a satellite signal is authentic (i.e., not being spoofed).

In one aspect, a computer-implemented method receives a first radio signal from a first terrestrial base station; estimates, from the first radio signal from the first terrestrial base station, a coarse location of the mobile device; determines a first time offset of the first radio signal to a timing signal of a target satellite; locates a position of the target satellite; determines a distance from the position of the target satellite to the estimated coarse location of the mobile device; and performs a GNSS search based on the distance from the target satellite and the first time offset of the first radio signal from the first terrestrial base station.

In another aspect, a machine readable non-transitory storage medium stores program instructions executable by a processor to: receive a first radio signal from a first terrestrial base station; estimate, from the first radio signal from the first terrestrial base station, a coarse location of the mobile device; determine a first time offset of the first radio signal to a timing signal of a target satellite; locate a position of the target satellite; determine a distance from the position of the target satellite to the estimated coarse location of the mobile device; and perform a GNSS search based on the distance from the target satellite and the first time offset of the first radio signal from the first terrestrial base station.

In yet another aspect, a device comprising: memory; and a processor coupled to the memory and configured to: receive a first radio signal from a first terrestrial base station; estimate, from the first radio signal from the first terrestrial base station, a coarse location of the mobile device; determine a first time offset of the first radio signal to a timing signal of a target satellite; locate a position of the target satellite; determine a distance from the position of the target satellite to the estimated coarse location of the mobile device; and perform a GNSS search based on the distance from the target satellite and the first time offset of the first radio signal from the first terrestrial base station.

In a further aspect, an apparatus comprises: means for receiving a first radio signal from a first terrestrial base station; means for estimating, from the first radio signal from the first terrestrial base station, a coarse location of the mobile device; means for determining a first time offset of the first radio signal to a timing signal of a target satellite; means for locating a position of the target satellite; means for determining a distance from the position of the target satellite to the estimated coarse location of the mobile device; and means for performing a GNSS search based on the distance from the target satellite and the first time offset of the first radio signal from the first terrestrial base station.

The above and other aspects, objects, and features of the present disclosure will become apparent from the following description of various embodiments, given in conjunction with the accompanying drawings.

DETAILED DESCRIPTION

The word "exemplary" or "example" is used herein to mean "serving as an example, instance, or illustration." Any aspect or embodiment described herein as "exemplary" or as an "example" is not necessarily to be construed as preferred or advantageous over other aspects or embodiments.

Some embodiments discussed herein provide for a mobile device to utilize one or more satellite vehicles with one or more terrestrial Base Stations (BS) (e.g., a cell tower or radio frequency transceiver) to localize the GNSS search space within the ranging code of a satellite as part of an Optimized GNSS Search (OGS) engine, module, or mobile device. In one embodiment, true absolute time is not known or needed to localize the GNSS search space within the ranging code of a satellite. In one embodiment, location and timing offsets (i.e., transmit time bias) from true absolute GNSS time for terrestrial base stations are determined in advance (e.g., by crowdscourcing) and referenced by an OGS capable mobile device to reduce GNSS search area for one or more target satellites. With the reduced GNSS search area within satellite ranging codes (i.e., pseudorandom noise (PRN) codes) an OGS enabled mobile device can acquire a target satellite vehicle more efficiently by not searching areas of the satellite ranging codes where the target satellite vehicle is unlikely to be found, saving processing resources and battery power.

In one embodiment, the mobile device verifies timing offsets between satellites and base stations to defend against GNSS spoofing. A GNSS spoofing attack attempts to deceive a mobile device GNSS receiver by broadcasting incorrect GNSS signals, structured to resemble a set of normal GNSS signals, or by rebroadcasting genuine signals captured elsewhere or at a different time. Spoofed GNSS signals may be modified in such a way as to cause the mobile device to estimate an incorrect position. To guard against the possibility of satellite spoofing in which third parties attempt to mislead mobile devices for GNSS position, the mobile device can check terrestrial base stations to verify the timing offsets from a target satellite and one or more base stations are consistent. In some embodiments, additional timing comparisons from nearby base stations can increase trustworthiness/reliability of the target satellite.

Figure 1:
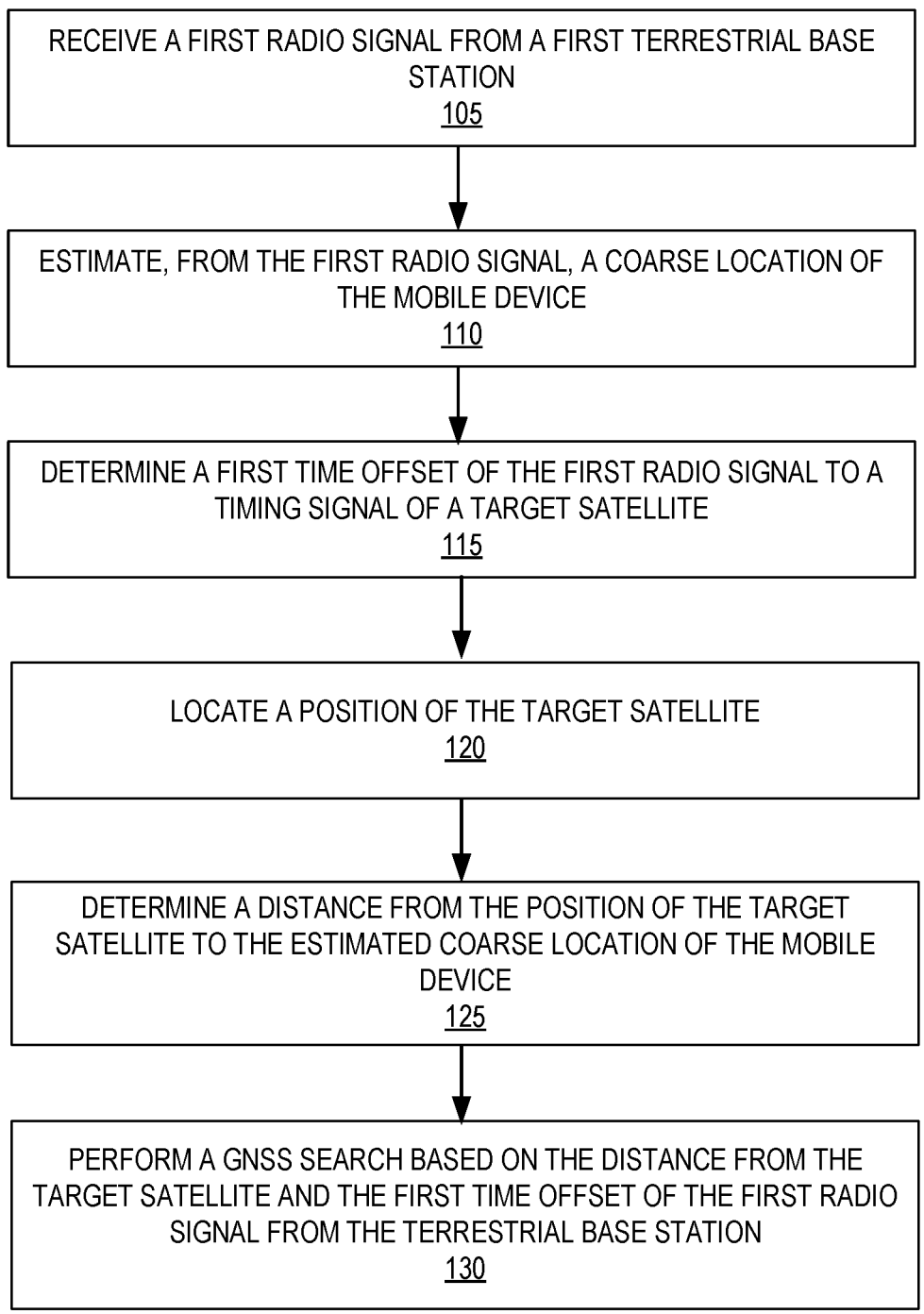
FIG. 1 is a flow diagram of a method to optimize GNSS search, in one embodiment.

FIG. 1 is a flow diagram of a method for implementing Optimized GNSS Search, in one embodiment. At block 105, an embodiment (for example, the method may be implemented by an OGS module or by OGS enabled device such as OGS device 400 below) receives a first radio signal from a first terrestrial base station. For example, the first radio signal may be sent by a nearby base station that may be received and acknowledged by the mobile device.

At block 110, the embodiment estimates, from the first radio signal from the terrestrial base station, a coarse location of the mobile device. For example, estimating the coarse location may include: referencing an identifier of the first terrestrial base station to determine its location and determining a particular uncertainty of the coarse location. The particular uncertainty may be determined according at least in part to an effective broadcast range or coverage area of the first terrestrial base station.

In some embodiments, the terrestrial base station may broadcast or otherwise be identified by a unique identification signature or identifier. In some embodiments the mobile device cross-references the unique identification signature with a geographic database to find the base station geographic location. In some embodiments, the base station geographic location may be received at the mobile device from a server performing crowdsourcing with multiple mobile devices. For example, a server may receive location information associated with base stations and combine or otherwise process all location information from a field of mobile devices taken at different times and different locations to refine a location of the base station (i.e., radio signal source location) over time and with more crowdsourced location data from mobile devices. In some embodiments, the mobile device receives crowdsourced data including base station identity and associated location at some before determining positioning. In some embodiments, the crowdsourcing data includes uncertainty information (e.g., effective broadcast range or coverage area of the first terrestrial base station). In some embodiments, the mobile device may come pre-loaded with crowdsourced data such that a user can enable OGS for GNSS positioning at any time.

As a result from determining base station location and approximate broadcast range of the base station, the mobile device can determine the mobile device coarse location within a particular uncertainty. For example there may be uncertainty with regards to not knowing exactly where the mobile device is within a broadcast area because the location of the base station cannot be assumed to be equal to the mobile device location unless the mobile device is right at the broadcast point of the base station. In some cases, the mobile device will be some distance away from the base station but still within broadcast range. In one embodiment, the uncertainty of the coarse location represents the range of position possibilities of the device within the particular base station's serving or coverage area. Base station serving or coverage area range may define the upper limit on the uncertainty for geographic location of a device. When a mobile device receives a radio signal from a respective base station, the mobile device may assume it is within the serving or coverage area of the respective base station and the uncertainty may represent the serving or coverage area extending outwards from the base station broadcast origin. The serving or coverage area may be estimated as an exact geometric circle with the BS broadcast origin at the center, however in more practical implementations the serving or coverage area may by asymmetrical or irregular in shape due in part to the influence of the particular terrain around the BS. For example, particular terrain can creates zones where signals are blocked by natural or manmade radio signal obstructions. In another example height differences in terrain may extend or reduce the range of the BS signal.

At block 115, the embodiment determines a first time offset of the first radio signal from the first terrestrial base station to a timing signal of a target satellite. In some embodiments, the time offset for a particular base station may be a fixed time offset or may be determined according to a specific offset model. For example, the timing offset is what aligns the timing signal of the base station with absolute GNSS time. In some instances, the base station is has a fixed time difference, however in many instances the base station time offset from absolute GNSS time will vary according to the particular position of the satellite in orbit. For example, the orbit may not be such that there is a constant fixed difference between base station time and GNSS time, rather the time difference will be more or less depending on the current estimated satellite position in orbit. Therefore, an offset model crowdsourced from multiple mobile devices can be used to determine the current time offset for the base station. For example, mobile devices within range of the base station may have accurate GNSS time and compare the time with the base station time to determine how the timing offset changes with respect to satellite position. Each of a group of mobile devices in an base station's broadcast area may determine an offset of a particular base station and report their particular offset calculation to a server which may determine either the fixed offset or the offset model to other mobile devices. A server may receive and then combine the multiple reports from mobile devices to derive timing offsets for the base station to more accurately predict time offset compared to absolute GNSS time.

The offset for a particular base station may be received at the mobile device from a server performing crowdsourcing or may be pre-loaded in the mobile device at some point in manufacture. In any case, the mobile device is assumed to have access to the crowdsourced data at the point when the mobile device determines a first time offset of the first radio signal from the first terrestrial base station to a timing signal of a target satellite. As above with base station location, the mobile device may be pre-populated with crowdsourced data including offset information for base stations such that a user can enable OGS for GNSS positioning at any time.

In one embodiment, the time offset is a sub millisecond offset. For example, time offset between the base station and satellite may be determined when both base station and satellite utilize 1 millisecond replication rates. For example, Global Positioning System (GPS) and Long-Term Evolution (LTE) subframe both utilize 1 millisecond replication rates such that the timing offset between GPS and LTE is directly applicable to each other enabling the reduced search space within the timing offset. However, embodiments herein are not limited in implementation to using only 1 millisecond replication rates. For example the particular replication rate shared between the base station and target SV be is ideally related such that the search space can be determined from equivalent timing offsets. Other GNSS systems and communication protocols may utilize related length replication rates to apply the OGS techniques described herein. "Related", as used above may refer to BS and satellite vehicle frames or subframes which enable a position or offset of the base station frame to be translated into an equivalent position or offset within the target satellite vehicle frame according to the embodiments described herein.

At block 120, the embodiment, locates a position of the target satellite. For example, the OGS device may locate the position of the target satellite (i.e., orbit location in space) by estimating time from one of: the first time offset, or other time source of the mobile device. In some embodiments, the mobile device utilizes a rough estimated absolute time (e.g., may be accurate within seconds, rather than precise millisecond accuracy typical of knowing an absolute time) to locate the position of the target satellite. The embodiment may determine the position of the target satellite from available satellite orbital models and a rough estimated absolute time. In some embodiments, the other time source of the mobile device includes Network Time Protocol (NTP) or from GNSS receiver notion of time. In some embodiments, the position of the target satellite is a position of the satellite in the sky relative to the position of the mobile device.

At block 130, the embodiment determines a distance from the position of the target satellite to the estimated coarse location of the mobile device.

At block 135, the embodiment performs a GNSS search based on the distance from the target satellite and the first time offset of the first radio signal from the first terrestrial base station. In some embodiments, performing the GNSS search may also include combining the distance determined at block 130, with the time offset of block 115 to prepare for searching for a target satellite ranging/PRN code within the mobile device's local time frame. For example, the result of combining the distance from the target satellite with the time offset may determine where within the 1 millisecond subframe to search for the target satellite. In some embodiments, the OGS device references the particular uncertainty to further widen the search area. For example, without taking into account for uncertainty, calculations may assume the mobile device is at a known location. However, the uncertainty of the mobile device actually being located anywhere within the base station broadcast range can be accounted for by widening the search area of the 1 millisecond subframe according to the base station coverage area uncertainty.

In some environments, such as in a building, or location where GNSS signal may be blocked the mobile device may not find the satellite within the 1 millisecond subframe reduced search space. However, the reduced search space may at least keep the mobile device from needlessly consumer processing resources searching for the satellite in areas outside of the narrow search space where the satellite is most likely to be found. In other embodiments, the user may allow the mobile device to continue the search outside of the search space at the cost of processing resources. For example, the mobile device may first check for the satellite within the search space provided by OGS then expand the search, for example by additionally increasing the uncertainty from an initial estimate until the entire search space is checked. In some embodiments, the reduced search space enables a mobile device not only to conserve resources when looking for a particular satellite, but also with the additional freed resources, can search multiple GNSS satellites in parallel or the mobile device may allocate more processing resources for the particular satellite for the same or less processing resources as traditional techniques.

In some embodiments the GNSS search area comprises searching a satellite ranging code according to a local time frame of the mobile device. For example, satellites may transmit simultaneously several ranging codes and navigation data using binary phase-shift keying. A limited number of central frequencies are used and satellites using the same frequency are distinguished by their particular ranging codes (e.g., GPS uses code division multiple access). Ranging codes may also be called chipping codes (in reference to CDMA/DSSS), pseudorandom noise (PRN) codes and pseudorandom binary sequences (i.e., predictable but resembling noise). Satellites are uniquely identified by a serial number called space vehicle number (SVN) and satellites may be numbered with a space vehicle identifier (SV ID) and pseudorandom noise number (PRN number) which uniquely identifies the ranging codes the particular satellite uses.

Figure 2:
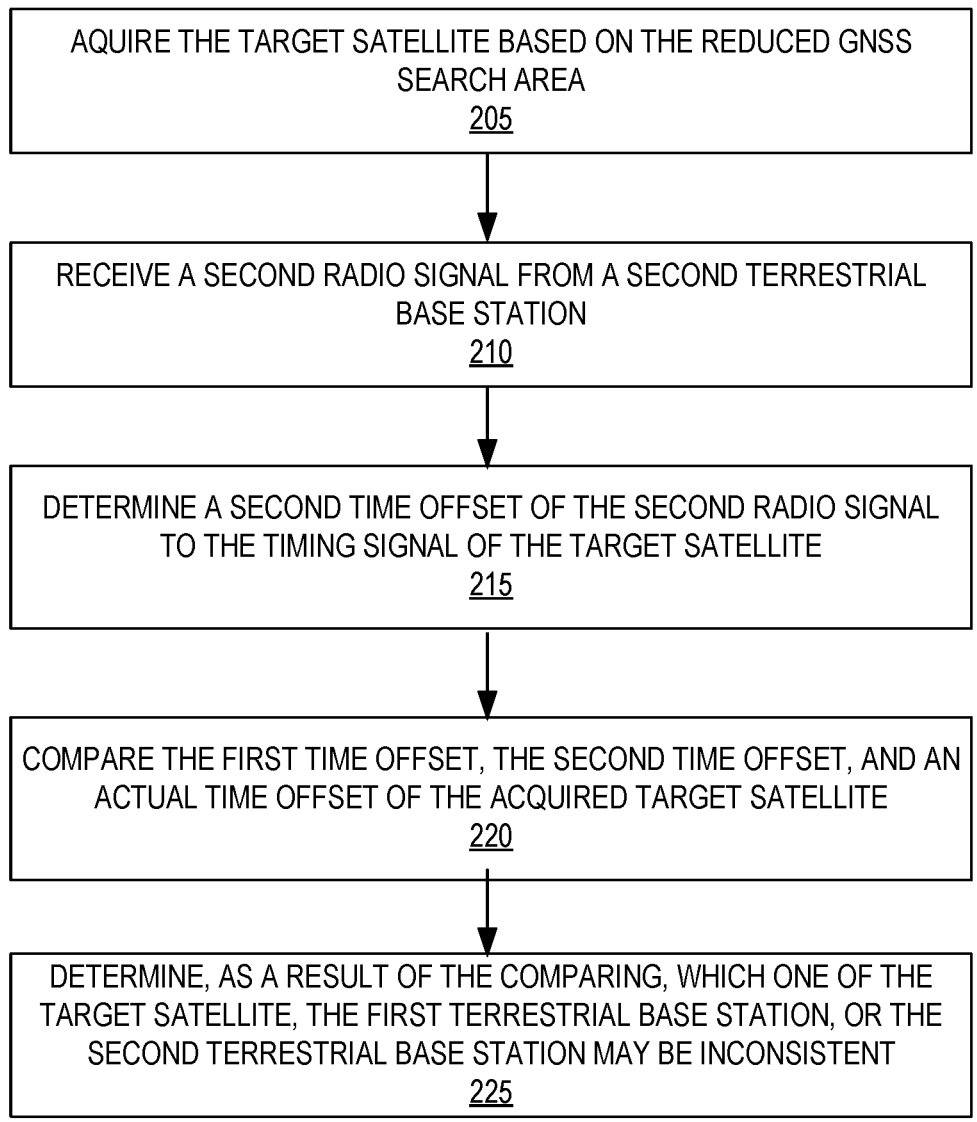
FIG. 2 is a flow diagram of a method to detect satellite inconsistencies, in one embodiment.

FIG. 2 is a flow diagram of a method for detecting inconsistencies between target satellites and base stations, in one embodiment. At block 205, the embodiment (for example, the method may be implemented by an OGS module or by OGS enabled device such as OGS device 400 below) acquires the target satellite based on the GNSS search area. A signal purporting to be from the target satellite is acquired, however the mobile device may next at block 210 begin to check for reliability.

At block 210, the embodiment, receives a second signal from a second terrestrial base station. In some embodiments, the second signal may be a broadcast signal of a nearby terrestrial base station. For example, the mobile device may be within range of multiple terrestrial base stations at the same time. While receiving multiple signals from the various nearby terrestrial base stations the mobile device can begin to check reliability of the satellite identity through comparisons to the received base station signals.

At block 215, the embodiment determines a second time offset of the second radio signal to the timing signal of the target satellite. For example, similar to block 120 above for FIG. 1, the time offset (i.e., the second time offset) may be determined from crowdsourced data and may be either a fixed time offset or may be determined according to a specific offset model. In one embodiment, the time offset (i.e., the second time offset) is a sub 1 millisecond frame offset such that the GNSS frame length exactly matches the base station frame length.

At block 220, the embodiment compares the first time offset, the second time offset, and an actual time offset of the acquired target satellite. In one embodiment, the offsets are adjusted according to each particular base station uncertainty (e.g., uncertainty may be determined via crowdsourcing or from the BS administrator). For example, as introduced above and illustrated below in FIG. 3 as distance 335, each base station has a broadcast range, which may be a component of the position uncertainty of the mobile device. For example, position uncertainty may be the potential distance range the mobile device may be from the broadcast center at the base station. In other words, if the broadcast range of BS "A" is 1 kilometer, the mobile device may be any position within a kilometer radius of the center of BS "A." For example, if a mobile device is assumed to be at or on top of the base station, there would be no uncertainty.

At block 225, the embodiment determines as a result of the comparing, which one of the target satellite, the first terrestrial base station, or the second terrestrial base station may be inconsistent.

Figure 3:
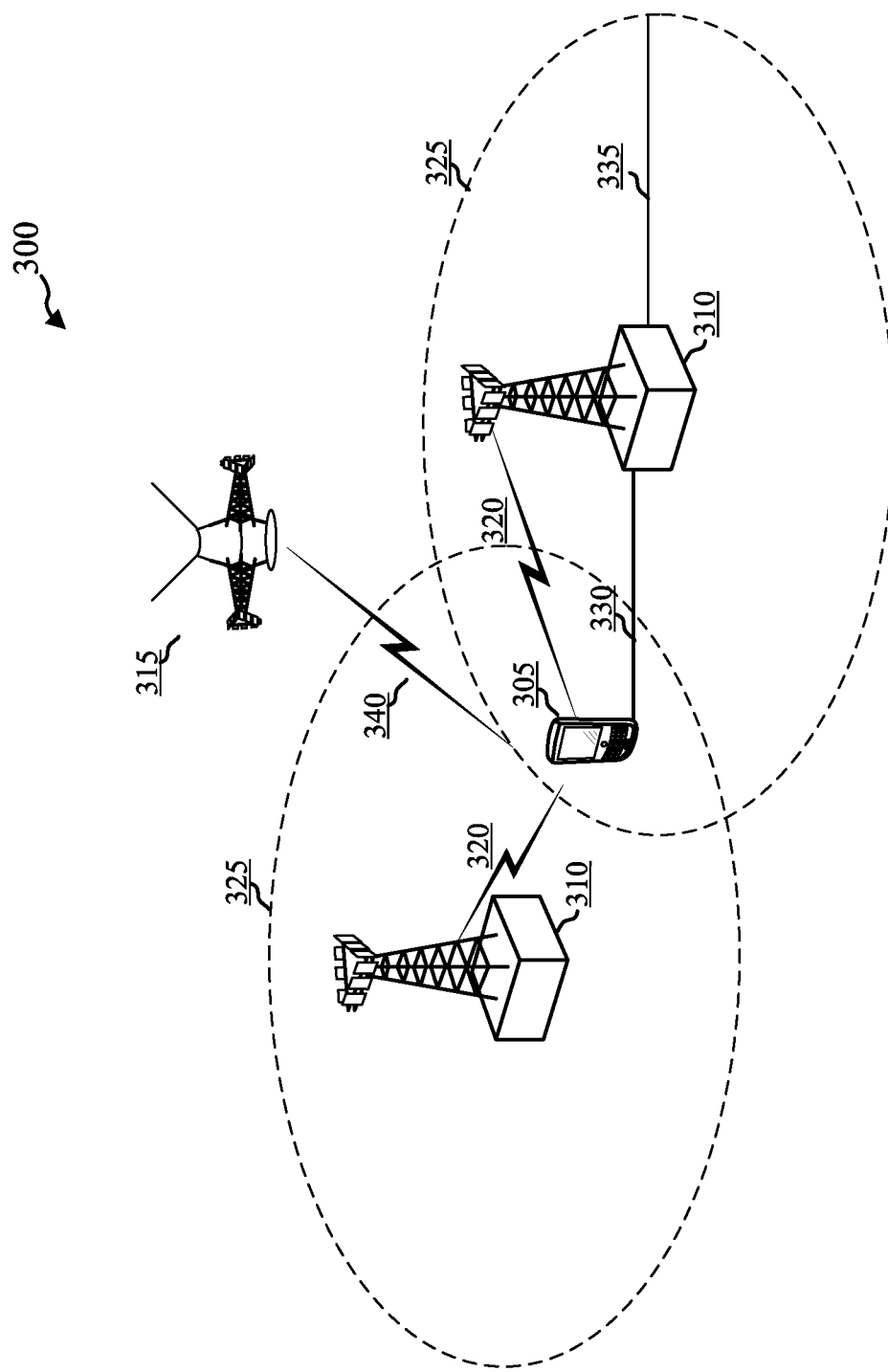
FIG. 3 illustrates a wireless communications operating environment for devices to optimize GNSS search, in one embodiment.

FIG. 3 illustrates a wireless communications operating environment for performing OGS, in one embodiment. The system 300 includes a device to perform OGS (e.g., device 305), terrestrial base stations (e.g., BS 310), and satellites within a GNSS (e.g., satellite vehicle 315).

The BS 310 may wirelessly communicate (e.g., communication signal 320) with the device 305 via one or more antennas. In some embodiments, BS 310 may provide communication coverage for a respective geographic area 325. In some embodiments, BS 310 may include a base station antenna (BSA), a radio base station, a radio transceiver, a basic service set (BSS), an extended service set (ESS), a NodeB, an evolved NodeB (eNB), a Home NodeB, a Home eNodeB, or some other suitable terminology. In some embodiments, the system 300 may include an LTE/LTE-A communications system (or network). The system 300 may include BS 310 of different types (e.g., macro, micro, and/or pico base stations). The BS 310 may also utilize different radio technologies and may be associated with the same or different access networks.

The coverage areas of different BS 310, including the coverage areas of the same or different types of BS 310, utilizing the same or different radio technologies, and/or belonging to the same or different access networks, may overlap. In some embodiments, device 305 may determine from a BS 310 broadcast signal (e.g., communication 320) one or more identifiers of the BS. Through the cross-reference of the identifier(s) with a geographical reference database, device 305 can determine the rough location of BS 310. For example, a server (not shown) may provide assistance or navigation data to device 305 specifying the location of BS 310, such that when device 305 receives signal identifying BS 310 as the transmitting BS device 305 can determine its location is within (e.g., distance from BS illustrated by distance 330 which is less than the maximum broadcast range 335 of BS 310. In some embodiments, the location of BS 310 is determined from crowdsourced time, distance, and place data from multiple mobile devices within range of BS 310. For example, device "A" may report receiving signals of a particular strength at location "X" while device "B" reports receiving signals of a particular strength at location "Y" and a server may combine the reports to determine a location of the base station according to the multiple crowdsourced mobile device reports. In some embodiments, the mobile device refers to prior obtained crowdsourced data for offset information and for location relating to the base stations.

In some embodiments, satellite 315 is one of multiple satellites which device 305 may use to determine position in a GNSS. For example, device 305 may include a GNSS receiver to measure the transmitting time of GNSS signals 340 emitted from four or more GNSS satellites (e.g., including satellite 315) and these measurements may be used to obtain position (i.e., spatial coordinates) and reception time.

Device 305 may be traverse throughout the wireless communications system 300, and may be stationary or mobile. Device 305 may also be referred to as a mobile station, a subscriber station, a mobile unit, a subscriber unit, a wireless unit, a remote unit, a wireless device, a wireless communication device, a remote device, a mobile subscriber station, an access terminal, a mobile terminal, a wireless terminal, a remote terminal, a handset, a user agent, a mobile client, a client, user equipment, or some other suitable terminology. Device 305 may be a cellular phone, a personal digital assistant (PDA), a wireless modem, a wireless communication device, a handheld device, a tablet computer, a laptop computer, a cordless phone, a wearable item such as a watch or glasses, a wireless local loop (WLL) station, or the like. Device 305 may be able to communicate over different access networks, such as cellular, Wireless Wide Area Network (WWAN), or Wireless Local Area Network (WLAN).

The communication links 320 shown in system 300 may include uplinks for carrying uplink or downlink transmissions (e.g., from device 305 to a BS 310). Device 305 can determine position based on network, GNSS, or mobile based positioning.

Figure 4:
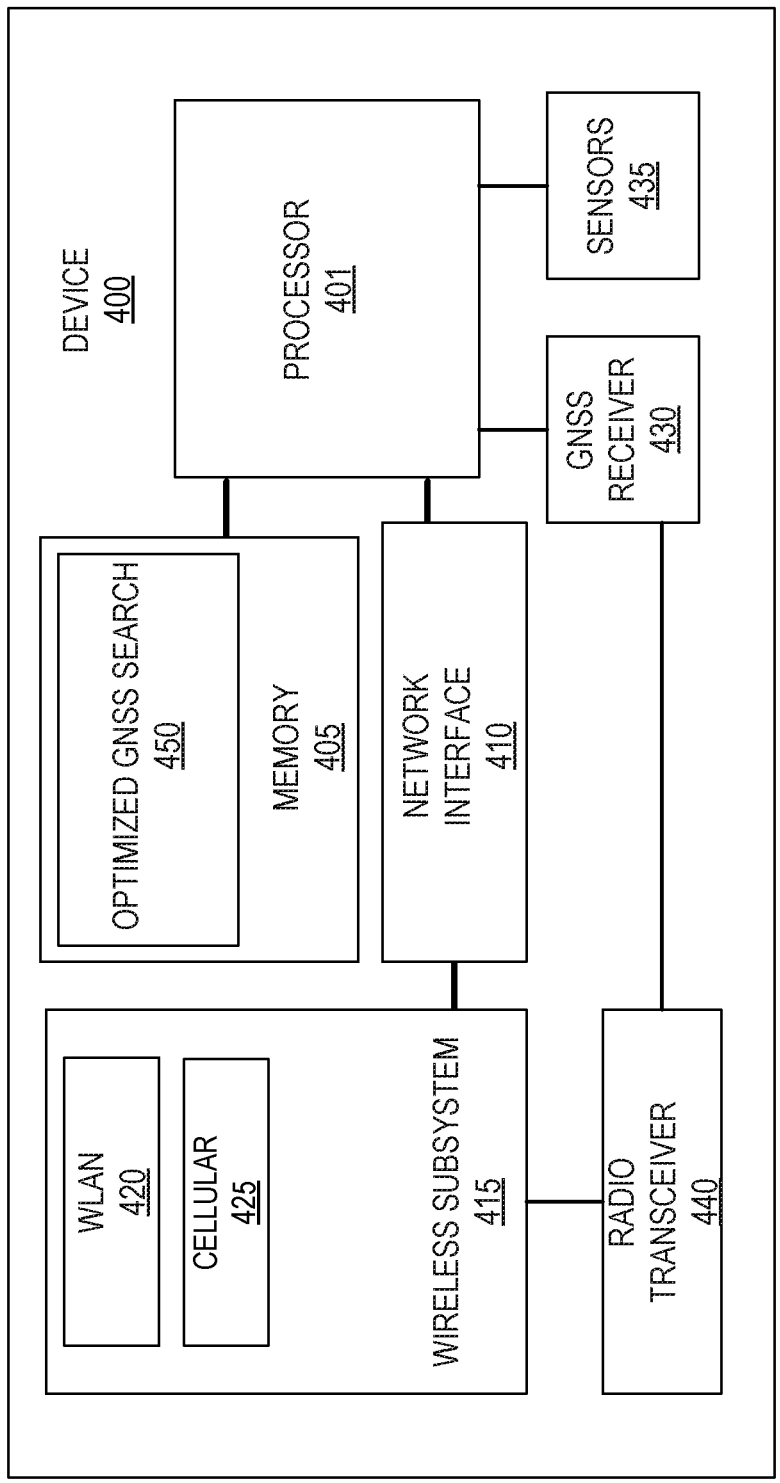
FIG. 4 illustrates an exemplary device to optimize GNSS search.

FIG. 4 is block diagram illustrating a device to perform OGS, in one embodiment. Device 400 may include one or more processors 401 (for example, a general purpose processor, specialized processor, or digital signal processor), a memory 405, cellular subsystem 425, and network interface 410. It should be appreciated that although not specifically drawn in FIG. 4, device 400 may also include a display, a user interface (I/F) (for example, keyboard, touch-screen, or similar devices), a power device (for example, a battery or power supply), as well as other components typically associated with electronic devices.

The device 400 may also include a number of device sensors 435 coupled to one or more buses or signal lines further coupled to the processor(s) 401. The sensors 435 may include a clock, ambient light sensor (ALS), accelerometer, gyroscope, magnetometer, temperature sensor, barometric pressure sensor, red-green-blue (RGB) color sensor, ultra-violet (UV) sensor, UV-A sensor, UV-B sensor, compass, proximity sensor. The wireless device may also include a Global Positioning System (GPS) or GNSS receiver 430 which may enable GPS or GNSS measurements in support of A-GNSS positioning. In some embodiments, multiple cameras are integrated or accessible to the wireless device. In some embodiments, other sensors may also have multiple versions or types within a single wireless device.

Memory 405 may be coupled to processor 401 to store instructions (for example, instructions to perform OGS 450) for execution by processor 401. In some embodiments, memory 405 is non-transitory. Memory 405 may also store software or firmware instructions (e.g. for one or more programs or modules) to implement embodiments described herein such as OGS embodiments described in association with FIGS. 1, and 2. Thus, the memory 405 is a processor-readable memory and/or a computer-readable memory that stores software code (programming code, instructions, etc.) configured to cause the processor 401 to perform the functions described herein. Alternatively, one or more functions of OGS may be performed in whole or in part in device hardware.

Memory 405 may also store data from integrated or external sensors. In addition, memory 405 may store application program interfaces (APIs) for providing access to one or more features of OGS as described herein. In some embodiments, OGS functionality can be implemented in memory 405. In other embodiments, OGS functionality can be implemented as a module separate from other elements in the wireless device 400. The OGS module may be wholly or partially implemented by other elements illustrated in FIG. 4, for example in the processor 401 and/or memory 405, or in one or more other elements of the device 400.

Network interface 410 may also be coupled to a number of wireless subsystems 415 (for example, WLAN 420, Cellular 425, or other networks) to transmit and receive data streams through radio transceiver 440 to/from a wireless network or through a wired interface for direct connection to networks (for example, the Internet, Ethernet, or other wireline systems). Wireless subsystems 415 may be connected to radio transceiver 440. Radio transceiver 440 may be connected to GPS or GNSS receiver 430 to enable reception of GPS or other GNSS signals by GPS or GNSS receiver 430. Radio transceiver 440 may utilize a single antenna, multiple antennas and/or an antenna array and may include antennas dedicated to receiving and/or transmitting one type of signal (e.g. cellular, WiFi or GNSS signals) and/or may include antennas that are shared for transmission and/or reception of multiple types of signals. WLAN subsystem 420 may comprise suitable devices, hardware, and/or software for communicating with and/or detecting signals from WiFi APs and/or other wireless devices within a network (e.g. femtocells). In one aspect, WLAN subsystem 420 may comprise a WiFi (802.11x) communication system suitable for communicating with one or more wireless access points.

Cellular subsystem 425 may include one or more wide area network transceiver(s) that may be connected to radio transceiver 440. The wide area network transceivers may comprise suitable devices, hardware, and/or software for communicating with and/or detecting signals to/from other wireless devices within a network. In one aspect, the wide area network transceivers may comprise a code division multiple access (CDMA) communication system suitable for communicating with a CDMA network of wireless base stations; however in other aspects, the wide area network transceivers may support communication with other cellular telephony networks or femtocells, such as, for example, time division multiple access (TDMA), Long-Term Evolution (LTE), Advanced LTE, Wideband Code Division Multiple Access (WCDMA), Universal Mobile Telecommunications System (UMTS), 4G, or Global System for Mobile Communications (GSM). Additionally, any other type of wireless networking technologies may be supported and used by wireless device 400, for example, WiMax (802.16), Ultra Wide Band, ZigBee, wireless USB, etc. In conventional digital cellular networks, position location capability can be provided by various time and/or phase measurement techniques. For example, in CDMA networks, one position determination approach used is Advanced Forward Link Trilateration (AFLT). Using AFLT, a server may compute a position for wireless device 400 from phase measurements made by device 400 of pilot signals transmitted from a plurality of base stations.

In one embodiment, device 400 implemented as a mobile device stores instructions (for example, within memory 405) executable by processor 401 to determine a reference position, receive signals (for example, via network interface 410) from BSs, and determine mobile device position based on signals from the BSs. Memory 405 may also store instructions to detect one or more unreliable BSs based mobile device positioning measurement quality based on the plurality of BSs and/or range measurement quality. Device 400 may also provide (for example, via network interface 410 and wireless subsystem 415) a status report including BS data and mobile device data.

The device as used herein (for example, device 400) may be a: wireless device, cell phone, internet of things device, personal digital assistant, mobile computer, wearable device (for example, watch, head mounted display, virtual reality glasses, etc.), tablet, personal computer, laptop computer, or any type of device that has wireless capabilities. As used herein, a wireless device may be any portable, or movable device or machine that is configurable to acquire wireless signals transmitted from, and transmit wireless signals to, one or more wireless communication devices or networks. Thus, by way of example but not limitation, the device 400 may include a radio device, a cellular telephone device, a computing device, a personal communication system device, or other like movable wireless communication equipped device, appliance, or machine. The term "device" is also intended to include devices which communicate with a personal navigation device, such as by short-range wireless, infrared, wireline connection, or other connection—regardless of whether satellite signal reception, assistance data reception, and/or position-related processing occurs at the device 400. Also, the term "device" is intended to include all devices, including wireless communication devices, computers, laptops, etc. which are capable of communication with a server, such as via the Internet, WiFi, or other network, and regardless of whether satellite signal reception, assistance data reception, and/or position-related processing occurs at the wireless device, at a server, or at another wireless device associated with the network. Any operable combination of the above can also be considered a "device" as used herein. Other uses may also be possible. While various examples given in the description below relate to wireless devices, the techniques described herein can be applied to other devices.

The device may communicate wirelessly with a plurality of APs, base stations and/or femtocells using RF signals (for example, 400 MHz, 1900 MHz, 2.4 GHz, 4.6 GHz, and 4.9/5.0 GHz bands) and standardized protocols for the modulation of the RF signals and the exchanging of information. For example, the protocol may be Institute of Electrical and Electronics Engineers (IEEE) 802.11x or 3GPP LTE. By extracting different types of information from the exchanged signals, and utilizing the layout of the network (i.e., the network geometry) the wireless device may determine its position within a predefined reference coordinate system.

It should be appreciated that embodiments of the invention as will be hereinafter described may be implemented through the execution of instructions, for example as stored in the memory 405 or other element, by processor 401 of device 400 and/or other circuitry of device 400 and/or other devices. Particularly, circuitry of device 400, including but not limited to processor 401, may operate under the control of a program, routine, or the execution of instructions to execute methods or processes in accordance with embodiments of the invention. For example, such a program may be implemented in firmware or software (e.g. stored in memory 405 and/or other locations) and may be implemented by processors, such as processor 401, and/or other circuitry of device 400. Further, it should be appreciated that the terms processor, microprocessor, circuitry, controller, etc., may refer to any type of logic or circuitry capable of executing logic, commands, instructions, software, firmware, functionality and the like.

Some or all of the functions, engines or modules described herein (for example, OGS features and methods illustrated in at least FIGS. 1-2) may be performed by the device 400 itself (for example, via instructions of module 450 stored in memory 405). For example, device 400 for refining a radio frequency (RF) time of arrival (TOA) may comprise memory 405 and processor 401 coupled to the memory. The memory 405 and processor 401 may be configured to: receive a first RF signal; convert, the first RF signal from time based domain to frequency based domain; receive a second RF signal, sampled at a time after the first RF signal; convert the second RF signal from time based domain to frequency based domain; shift, in frequency based domain, one or both of: the converted first RF signal, or the converted second RF signal; combine at least the converted first RF signal and the converted second RF signal into a combined RF signal; and determine a refined TOA peak measurement from the combined RF signal. In some embodiments, device 400 provides the means for implementing the OGS described herein, such as at least with respect to the features of FIGS. 1 and 2 above. For example, mobile device may be an apparatus to provide means for receiving a first radio signal from a first terrestrial base station; means for estimating, from the first radio signal, a coarse location of the mobile device; means for determining a first time offset of the first radio signal to a timing signal of a target satellite; means for locating a position of the target satellite; means for determining a distance from the position of the target satellite to the estimated coarse location of the mobile device; and means for performing a GNSS search based on the distance from the target satellite and the first time offset of the first radio signal from the first terrestrial base station.

In one embodiment, a mobile device (e.g., device 400) is configured to reduce the mobile device's GNSS search area. For example, device 400 may include memory 405, a radio transceiver 440 for receiving radio signals, and processor 401 may be coupled to memory 405 and to the radio transceiver 440 and configured to: receive a first radio signal from a first terrestrial base station; estimate, from the first radio signal from the first terrestrial base station, a coarse location of the mobile device; determine a first time offset of the first radio signal to a timing signal of a target satellite; locate a position of the target satellite; determine a distance from the position of the target satellite to the estimated coarse location of the mobile device; and perform a GNSS search based on the distance from the target satellite and the first time offset of the first radio signal from the first terrestrial base station.

In one embodiment, the estimating the coarse location further comprises referencing the identity of the first terrestrial base station to determine its location and determining a particular uncertainty of the coarse location, wherein the particular uncertainty is determined according at least in part to an effective broadcast range of the first terrestrial base station. In one embodiment, the mobile device also has instructions to reference the particular uncertainty to determine a search width for the GNSS search area. In one embodiment, the GNSS search area comprises searching a satellite ranging code according to a local time frame of the mobile device. In another embodiment, the mobile device is further configured to receive a second signal from a second terrestrial base station; determine a second time offset of the second terrestrial base station to the timing signal of the target satellite; compare, within a local mobile device time frame, timing of the first terrestrial base station to the second terrestrial base station; compare, a broadcast distance uncertainty of the first terrestrial base station to the second terrestrial base station; and detect inconsistencies of the target satellite when one or more of the timing or the uncertainty is outside of a threshold.

In some embodiments or some or all of the functions, engines or modules described herein may be performed by another system connected through an I/O controller or network interface 410 (wirelessly or wired) to the device. Thus, some and/or all of the functions may be performed by another system and the results or intermediate calculations may be transferred back to the wireless device. In some embodiments, such other device may comprise a server configured to process information in real time or near real time. In some embodiments, the other device is configured to predetermine the results, for example based on a known configuration of the device. Further, one or more of the elements illustrated in FIG. 4 may be omitted from the device 400. For example, one or more of the sensors 435 may be omitted in some embodiments.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The word "exemplary" is used herein to mean "serving as an example, instance, or illustration." Any embodiment described herein as "exemplary" is not necessarily to be construed as preferred or advantageous over other embodiments. Likewise, the term "embodiments" does not require that all embodiments include the discussed feature, advantage or mode of operation.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises", "comprising", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device (for example, a server or device). It will be recognized that various actions described herein can be performed by specific circuits (for example, application specific integrated circuits), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

Those of skill would further appreciate that the various illustrative logical blocks, modules, engines, circuits, and algorithm steps described in connection with the embodiments disclosed herein may be implemented as electronic hardware, computer software, or combinations of both. To clearly illustrate this interchangeability of hardware and software, various illustrative components, blocks, modules, engines, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in random access memory (RAM), flash memory, read only memory (ROM), erasable programmable read-only memory (EPROM), electrically erasable programmable read-only memory (EEPROM), registers, hard disk, a removable disk, a compact disc read only memory (CD-ROM), digital versatile disc (DVD), or any other form of storage medium known in the art (e.g., a machine readable non-transitory storage medium having stored therein program instructions that are executable by one or more processors). An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions or modules described may be implemented in hardware, software, firmware, or any combination thereof. If implemented in software as a computer program product, the functions or modules may be stored on or transmitted over as one or more instructions or code on a non-transitory computer-readable medium. Computer-readable media can include both computer storage media and communication media including any medium that facilitates transfer of a computer program from one place to another. A storage media may be any available media that can be accessed by a computer. By way of example, and not limitation, such non-transitory computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a web site, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of non-transitory computer-readable media.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method to reduce a GNSS search area by a mobile device, the method comprising:
   receiving a first radio signal from a first terrestrial base station;
   estimating, from the first radio signal, a coarse location of the mobile device;
   determining a first time offset of the first radio signal to a timing signal of a target satellite;
   locating a position of the target satellite;
   determining a distance from the position of the target satellite to the estimated coarse location of the mobile device; and
   performing a GNSS search based on the distance from the target satellite and the first time offset of the first radio signal from the first terrestrial base station.

2. The method of claim 1, wherein locating the position comprises:
   estimating time from one or both of:
   the first time offset, or
   other time source of the mobile device.

3. The method of claim 1, wherein estimating the coarse location further comprises:
   determine the coarse location of the mobile device based on the first terrestrial base station; and
   determining a particular uncertainty of the coarse location based at least in part on a broadcast range of the first terrestrial base station.

4. The method of claim 1, wherein the GNSS search area is determined according to an uncertainty of the coarse location.

5. The method of claim 1, wherein the GNSS search area comprises searching a satellite ranging code according to a local time frame of the mobile device.

6. The method of claim 1, further comprising:
   acquiring the target satellite based on the GNSS search area;
   comparing the first time offset to an actual time offset of the acquired target satellite; and
   determining one or both of the target satellite or the base station is inconsistent.

7. The method of claim 1, further comprising:
   acquiring the target satellite based on the GNSS search area;
   receiving a second signal from a second terrestrial base station;
   determining a second time offset of the second terrestrial base station to the timing signal of the target satellite;
   comparing the first time offset, the second time offset, and an actual time offset of the acquired target satellite; and determining, as a result of the comparing, which one of the target satellite, the first terrestrial base station, or the second terrestrial base station is inconsistent.

8. A mobile device to reduce GNSS search area for positioning, the mobile device comprising:
   memory; and
   an radio transceiver for receiving radio signals; and
   a processor coupled to the memory and to the radio transceiver and the processor configured to:
   receive a first radio signal from a first terrestrial base station;
   estimate, from the first radio signal, a coarse location of the mobile device;
   determine a first time offset of the first radio signal to a timing signal of a target satellite;
   locate a position of the target satellite;
   determine a distance from the position of the target satellite to the estimated coarse location of the mobile device; and
   perform a GNSS search based on the distance from the target satellite and the first time offset of the first radio signal from the first terrestrial base station.

9. The device of claim 8, wherein the processor coupled to the memory and to the radio transceiver configured for locating the position comprises the processor coupled to the memory and to the radio transceiver further configured to:
   estimate time from one or both of:
   the first time offset, or
   other time source of the mobile device.

10. The device of claim 8, wherein the processor coupled to the memory and to the radio transceiver configured for estimating the coarse location comprises the processor coupled to the memory and to the radio transceiver further configured to:
   determine the coarse location of the mobile device based on the first terrestrial base station; and
   determine a particular uncertainty of the coarse location based at least in part on a broadcast range of the first terrestrial base station.

11. The device of claim 8, wherein the GNSS search area is determined according to an uncertainty of the coarse location.

12. The device of claim 8, wherein the GNSS search area comprises searching a satellite ranging code according to a local time frame of the mobile device.

13. The device of claim 8, the processor coupled to the memory and to the radio transceiver further configured to:
   acquire the target satellite based on the GNSS search area;
   comparing the first time offset to an actual time offset of the acquired target satellite; and
   determine one or both of the target satellite or the base station is inconsistent.

14. The device of claim 8, the processor coupled to the memory and to the radio transceiver further configured to:
   acquire the target satellite based on the GNSS search area;
   receive a second signal from a second terrestrial base station;
   determine a second time offset of the second terrestrial base station to the timing signal of the target satellite;
   compare the first time offset, the second time offset, and an actual time offset of the acquired target satellite; and
   determine, as a result of the comparing, which one of the target satellite, the first terrestrial base station, or the second terrestrial base station is inconsistent.

15. A machine readable non-transitory storage medium having stored therein program instructions that are executable by one or more processors, the program instructions including instructions for the one or more processors to:
   receive a first radio signal from a first terrestrial base station;
   estimate, from the first radio signal, a coarse location of the mobile device;
   determine a first time offset of the first radio signal to a timing signal of a target satellite;
   locate a position of the target satellite;
   determine a distance from the position of the target satellite to the estimated coarse location of the mobile device; and
   perform a GNSS search based on the distance from the target satellite and the first time offset of the first radio signal from the first terrestrial base station.

16. The medium of claim 15, wherein the instructions for the one or more processors to locate the position comprises instructions for the one or more processors to:
   estimate time from one or both of:
   the first time offset, or
   other time source of the mobile device.

17. The medium of claim 15, wherein the instructions for the one or more processors to estimating the coarse location comprises instructions for the one or more processors to:
   determine the coarse location of the mobile device based on the first terrestrial base station; and
   determine a particular uncertainty of the coarse location based at least in part on a broadcast range of the first terrestrial base station.

18. The medium of claim 15, wherein the GNSS search area is determined according to an uncertainty of the coarse location.

19. The medium of claim 15, wherein the GNSS search area comprises searching a satellite ranging code according to a local time frame of the mobile device.

20. The medium of claim 15, further comprising instructions for the one or more processors to:
   acquire the target satellite based on the GNSS search area;
   comparing the first time offset to an actual time offset of the acquired target satellite; and
   determine one or both of the target satellite or the base station is inconsistent.

21. The medium of claim 15, further comprising instructions for the one or more processors to:
   acquire the target satellite based on the GNSS search area;
   receive a second signal from a second terrestrial base station;
   determine a second time offset of the second terrestrial base station to the timing signal of the target satellite;
   compare the first time offset, the second time offset, and an actual time offset of the acquired target satellite; and
   determine, as a result of the comparing, which one of the target satellite, the first terrestrial base station, or the second terrestrial base station is inconsistent.

22. An apparatus to reduce GNSS search area by a mobile device, the apparatus comprising:
   means for receiving a first radio signal from a first terrestrial base station;
   means for estimating, from the first radio signal, a coarse location of the mobile device;
   means for determining a first time offset of the first radio signal to a timing signal of a target satellite;
   means for locating a position of the target satellite;
   means for determining a distance from the position of the target satellite to the estimated coarse location of the mobile device; and means for performing a GNSS search based on the distance from the target satellite and the first time offset of the first radio signal from the first terrestrial base station.

23. The apparatus of claim 22, wherein the means for locating the position comprises:
estimating time from one or both of:
the first time offset, or
other time source of the mobile device.

24. The apparatus of claim 22, wherein means for estimating the coarse location further comprises:
means for determining the coarse location of the mobile device based on the first terrestrial base station; and
means for determining a particular uncertainty of the coarse location based at least in part on a broadcast range of the first terrestrial base station.

25. The apparatus of claim 22, wherein the GNSS search area is determined according to an uncertainty of the coarse location.

26. The apparatus of claim 22, wherein the GNSS search area comprises searching a satellite ranging code according to a local time frame of the mobile device.

27. The apparatus of claim 22, further comprising:
means for acquiring the target satellite based on the GNSS search area;
means for comparing the first time offset to an actual time offset of the acquired target satellite; and
means for determining one or both of the target satellite or the base station is inconsistent.

28. The apparatus of claim 22, further comprising:
means for acquiring the target satellite based on the GNSS search area;
means for receiving a second signal from a second terrestrial base station;
means for determining a second time offset of the second terrestrial base station to the timing signal of the target satellite;
means for comparing the first time offset, the second time offset, and an actual time offset of the acquired target satellite; and
means for determining, as a result of the comparing, which one of the target satellite, the first terrestrial base station, or the second terrestrial base station is inconsistent.

* * * * *